United States Patent [19]

Koshkin et al.

[11] 4,192,715
[45] Mar. 11, 1980

[54] FUEL ASSEMBLY HANDLING SYSTEM OF NUCLEAR REACTOR

[76] Inventors: Jury N. Koshkin, ulitsa Zvezdinka, 3, kv. 10; Georgy V. Ordynsky, ulitsa Strazh Revoljutsii, 9/6, kv. 9; Tsolak G. Shkhiyan, naberezhnaya Zhdanova, 6, kv. 16; Alexandr F. Shapkin, ulitsa Zvezdinka, 3, kv. 64; Alexandr I. Fadeev, ulitsa Engelsa, 21, kv. 46; Fedor V. Laptev, prospekt Lenina, 57, kv. 31; Vladimir I. Batjukov, ulitsa Prygunova, 9, kv. 29; Konstantin I. Korolkov, ulitsa Shalyapina, 19, kv. 77; Ivan V. Borodin, ulitsa Shalyapina, 15, kv. 2; Evgeny N. Chernomordik, ploschad Gorkogo, 2, kv. 30; Vitaly G. Osipov, ulitsa Berezovskaya, 89, kv. 55, all of Gorky, U.S.S.R.

[21] Appl. No.: 826,976

[22] Filed: Aug. 23, 1977

[51] Int. Cl.² .............. G21C 19/20; B66C 17/08; B66C 1/10
[52] U.S. Cl. .................. 176/30; 294/86 A; 414/146
[58] Field of Search .......... 176/30; 214/18 N; 294/86 A

[56] References Cited

U.S. PATENT DOCUMENTS

| | | | |
|---|---|---|---|
| 3,082,893 | 3/1963 | Hollings | 176/30 |
| 3,341,423 | 9/1967 | Costes | 214/18 N |
| 3,580,804 | 5/1971 | Paget | 176/30 |
| 3,756,914 | 9/1973 | Whittaker | 214/18 N |
| 3,909,350 | 9/1975 | Dupuy | 214/18 N |
| 3,990,591 | 11/1976 | Street | 176/30 |

Primary Examiner—Samuel W. Engle
Assistant Examiner—Donald P. Walsh
Attorney, Agent, or Firm—Fleit & Jacobson

[57] ABSTRACT

The proposed system for handling fuel assemblies of a nuclear reactor comprises a sealed chamber housing a recharging machine comprising a carrier tube, wherein there is arranged a manipulator tube interacting with a reduction gear. Inside the manipulator tube there is a grip suspended on a chain interacting with another reduction gear. Extending through an opening in the cover of the sealed chamber is a vertical rotary tube with a bracket mounted thereon. The carrier tube is suspended on the bracket. Installed in the wall of the sealed chamber are inductive transmitters of the manipulator tube position. The system further includes three drives located outside the sealed chamber, of which two are kinematically coupled to the reduction gears, respectively. The third drive is kinematically coupled to the vertical rotary tube and turns the tube through a prescribed angle. Placed inside the vertical rotary tube are those shafts of the first two drives, which extend through the opening provided in the cover of the sealed chamber. As the vertical rotary tube turns, the manipulator tube interacts with channels arranged on the path of its movement, as well as with the respective transmitters of the manipulator tube position. The invention raises the reliability of nuclear reactors and reduces down time in the course of fuel recharging and maintenance of the fuel recharging equipment.

3 Claims, 9 Drawing Figures

FUEL ASSEMBLY HANDLING SYSTEM OF NUCLEAR REACTOR

The present invention relates to nuclear reactors and, more particularly, to systems for handling fuel assemblies of nuclear reactors.

The invention is applicable to fast breeders.

The current rapid industrial progress and the growing demand for power account for the designing and construction of a large network of atomic power plants. In the course of operation of such plants, it is necessary to periodically replace spent fuel assemblies with new ones. Such operations are the most frequent in the case of fast breeders whose fuel recharging systems include a number of complicated recharging mechanisms.

An increase in the output of atomic power stations requires the use of increasing numbers of fuel assemblies in nuclear reactors and a proportional increase in the number of fuel assemblies to be handled. As a rule, an atomic power plant stops producing electrical energy while fuel assemblies are being replaced (the nuclear reactor is shut down for cooling); clearly, an increase in the number of fuel assemblies to be handled results in an increased down time of the power plant.

For many fast breeders, the operations of replacing fuel assemblies fall into these three categories:

operations of the first category involve the transfer of fuel assemblies between the reactor core and an intermediate distribution chamber located in the reactor vessel;

operations of the second group involve the transfer of new and spent fuel assemblies between an intermediate distribution chamber and storage containers for storing new and spent fuel assemblies;

operations of the third category envisage steps of preparing new fuel assemblies and treating used fuel assemblies, which are performed outside the reactor.

The present invention is concerned with a fuel assembly handling system for carrying out the operations of the second group, i.e. the transfer of fuel assemblies between an intermediate distribution chamber arranged in the reactor vessel and storage containers for new and used fuel assemblies located outside the reactor vessel. The arrangement of the mechanisms included in the system is to minimize the time for carrying out the fuel assembly handling operations.

There is known a fuel assembly handling system of a nuclear reactor, comprising a sealed chamber, in whose bottoms there are provided channels, said sealed chamber housing a recharging machine which includes a manipulator tube with a rack hatched on its outer surface, a reduction gear whose gear interacts with the rack to move the manipulator tube in the vertical direction, a grip suspended on a chain inside the manipulator tube, a second reduction gear whose housing is mounted on the upper flange of the manipulator tube, the sprocket of said second reduction gear interacting with the chain for vertically moving the grip inside the manipulator tube, inductive transmitters of the position of the manipulator tube, and drives arranged on the cover of the sealed chamber, two of said drives being kinematically coupled by means of their shafts to said reduction gears, respectively. The recharging machine comprises a platform which runs on rails between the recharging channels. The platform carries a reduction gear interacting with the manipulator tube, and another reduction gear to move the platform in the chamber, the latter reduction gear being kinematically coupled to the third drive.

However, the fact that the recharging machine comprises the platform which runs on the rails, the driven shafts arranged on all the paths of its movements in the chamber, and sealed gear drives, accounts for great complexity and low reliability of the mechanisms incorporated in the fuel assembly handling system.

Besides, the use of the system under review accounts for prolonged down time of nuclear reactors in the course of handling fuel assemblies and maintenance of the fuel assembly handling equipment.

It is an object of the present invention to simplify the mechanisms included in the fuel assembly handling system.

It is another object of the invention to raise the reliability of the mechanisms included in the fuel assembly handling system, and facilitate access to these mechanisms.

It is still another object of the invention to reduce the down time of nuclear reactors in the course of fuel assembly handling operations.

The present invention essentially consists in providing a system for handling fuel assemblies of a nuclear reactor, comprising a sealed chamber with channels provided in its bottom, said sealed chamber housing a recharging machine which comprises a manipulator tube with a rack hatched on its outer surface, a first reduction gear whose gear interacts with the rack to vertically move the manipulator tube, a grip suspended on a chain inside the manipulator tube, a second reduction gear whose housing is mounted on an upper flange of the manipulator tube, its sprocket interacting with the chain to vertically move the grip inside the manipulator tube, inductive transmitters of the position of the manipulator tube, and drives arranged on a cover of the sealed chamber, two of said drives being kinematically coupled by means of their shafts to said first and second reduction gears, respectively, in which system the recharging machine includes, according to the invention, a vertical rotary tube extending through an opening provided in the cover of the sealed chamber, the end of said vertical rotary tube, which protrudes from the chamber, being connected to a toothed pair and a third drive to turn said rotary tube through a prescribed angle, inside said rotary tube there being arranged those shafts of the first and second drives, which extend through said opening in the cover of the sealed chamber, a carrier tube which envelops the manipulator tube, on a lower flange of said carrier tube there being mounted the housing of the reduction gear interacting with the manipulator tube, a bracket mounted on the rotary tube, whereupon there is suspended the carrier tube, the manipulator tube interacting, as the rotary tube turns, with the channels arranged on the path of its movement and the respective inductive transmitters of the position of the manipulator tube, which transmitters are installed in plugs secured in the wall of the sealed chamber.

It is expedient that the recharging machine should be provided with a means to eliminate vibration of the manipulator tube, said means being mounted on the rotary tube.

The proposed design of the recharging machine simplifies the mechanisms incorporated in the fuel assembly handling system, raises their reliability and facilitates access to these mechanisms for maintenance purposes. All this is due to the fact that the manipulator tube is arranged in the carrier tube, suspended through the bracket on the vertical rotary tube and, as the vertical rotary tube turns, moves along a path, whereon there are arranged the recharging channels, the drives being mounted on the cover of the sealed chamber.

In addition, the proposed system for handling fuel assemblies makes it possible to reduce the down time of a nuclear reactor in the course of fuel recharging and maintenance of the fuel recharging equipment. This is due to an increased operating speed of the mechanisms; another reason is that the principle of interaction between the recharging machine and the channels reduces the time for the movement of the manipulator tube of the recharging machine along a circular path, whereupon the channels are arranged; finally, this is due to reduced inspection and maintenance time because of the facilitated access to the mechanisms of the proposed fuel assembly handling system.

Other objects and advantages of the present invention will become more apparent from the following detailed description of a preferred embodiment thereof to be read in conjunction with the accompanying drawings, wherein.

Figure 1:
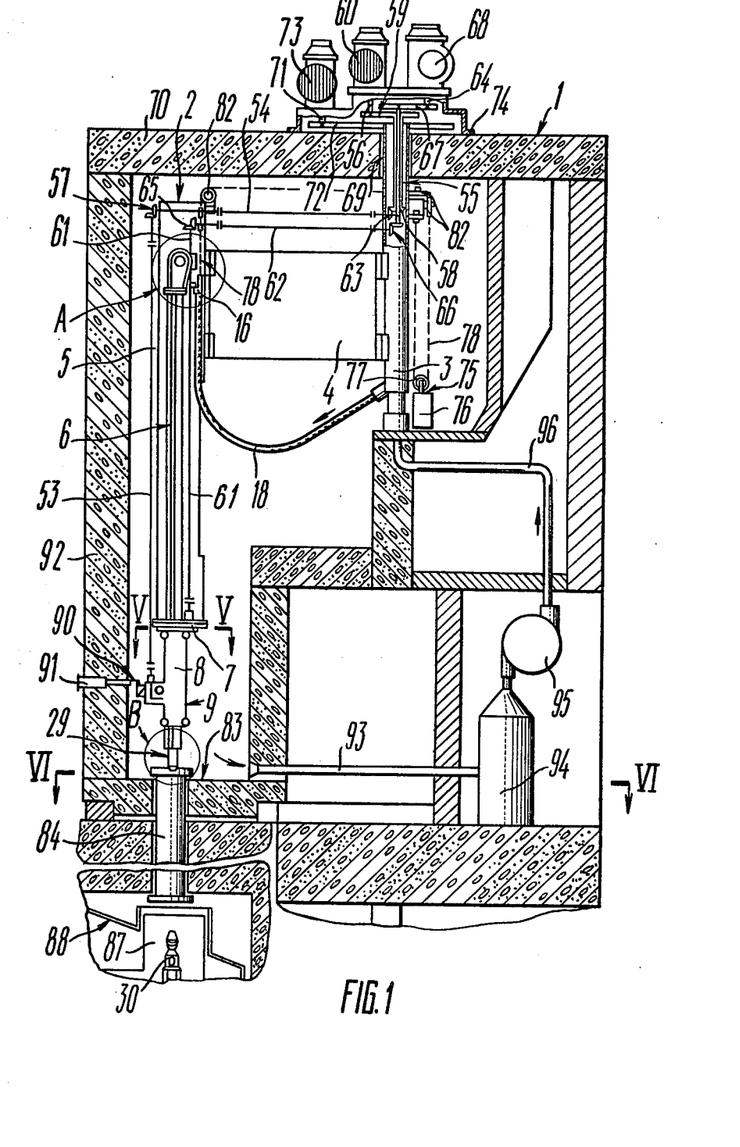
FIG. 1 is a sectional front view of a system for handling fuel assemblies of a nuclear reactor, in accordance with the invention.
Figure 2:
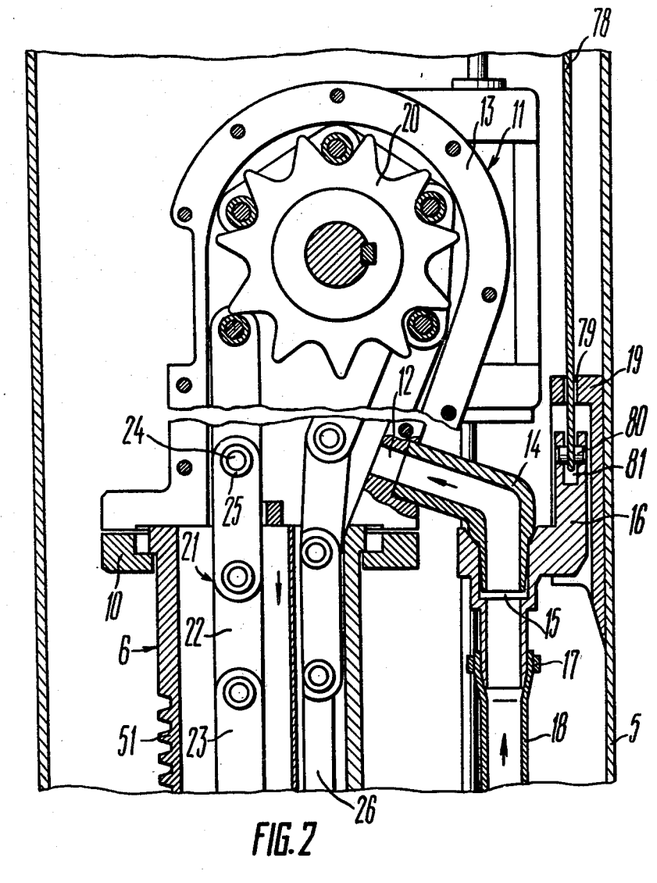
FIG. 2 is a view of the unit A of FIG. 1, in accordance with the invention.
Figure 3:
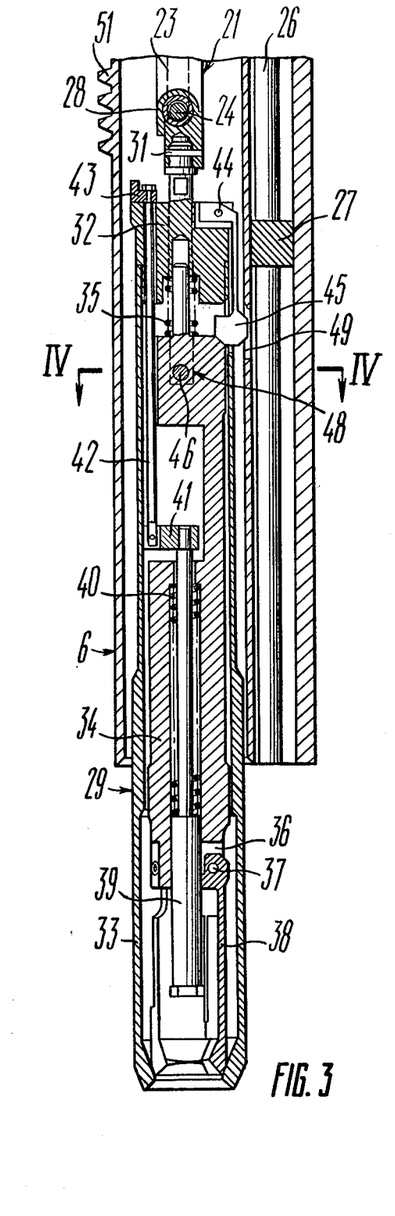
FIG. 3 is a view of the unit B of FIG. 1, in accordance with the invention.
Figure 4:
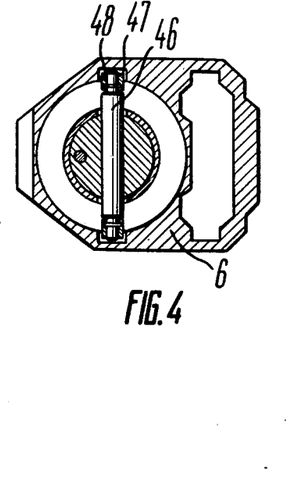
FIG. 4 is a section taken on the line IV—IV of FIG. 3, in accordance with the invention.

Referring now to the attached drawings, the proposed system for handling fuel assemblies of a nuclear reactor comprises a sealed chamber 1 (FIG. 1) which ensures biological shielding and is filled with an inert gas. The chamber 1 houses a recharging machine 2 comprising a vertical rotary tube 3, whereupon there is mounted a bracket 4. Suspended on the bracket 4 is a carrier tube 5, wherein there is arranged a manipulator tube 6. On a lower flange 7 of the carrier tube 5 there is mounted a housing 8 of a first reduction gear 9. On an upper flange 10 (FIG. 2) of the manipulator tube 6 there is mounted a second reduction gear 11. In an opening 12, provided in a housing 13 of the reduction gear 11, there is secured an end of a pipe 14, whose other end is inserted into an orifice 15 of a carrier pipe 16. Attached to the lower portion of the carrier pipe 16 by means of a nut 17 is a flexible hose 18. The upward vertical movement of the carrier pipe 16 is limited by a stop 19 rigidly mounted on the internal surface of the carrier tube 5. Arranged in the housing 13 of the reduction gear 11 is a sprocket 20 which interacts with a chain 21. The chain 21 comprises internal links 22 and external links 23 which are interconnected by axles 24. Mounted on the ends of the axles 24 are rollers 25. The first, free end of the chain 21 is arranged in a cavity 26 (FIGS. 2 and 3) to receive the chain 21, which cavity 26 is provided in the manipulator tube 6 and has a stopper 27 (FIG. 3) in its lower portion. The extreme lower external link 23 of the second end of the chain 21 is connected by means of the axle 24 to a shackle 28 of a grip 29 intended for holding and transporting a fuel assembly 30 (FIG. 1). The shackle 28 (FIG. 3) is rigidly secured by a pin 31 to a girdle 32 of a housing 33 of the grip 29. Arranged in the housing 33 is a slider 34. Arranged between the girdle 32 and the slider 34 is a spring 35. In slots 36 of the slider 34, on axles 37, there are movably arranged three profiled grip pawls 38. Arranged in the slider 34 is a rod 39 which interacts with the slider 34 through a spring 40. Through a strip 41 and a bar 42 the rod 39 is connected to a contactor of an inductive transmitter (not shown) which produces a signal in case the grip 29 (FIGS. 1 and 3) holds the fuel assembly 30 (FIG. 1). On the girdle 32 (FIG. 3), movably with respect to an axle 44, is mounted a locking means 45. On the slider 34 there is mounted a thrust pin 46 (FIG. 4), on whose ends there are mounted rollers 47 which are similar to the rollers 25 (FIG. 2) of the chain 21. The rollers 47 (FIG. 4) are received in slots 48 provided on the internal surface of the manipulator tube 6 (FIG. 3), whereby the grip 29 is oriented inside the manipulator tube 6. The slots 48 do not extend as far as the lower end of the manipulator tube 6. In the manipulator tube 6 there is provided an opening 49 arranged opposite the locking means 45 when the grip 29 is in its lower position. In the housing 8 (FIG. 5) of the first reduction gear 9 there is arranged a gear 50 which interacts with a rack 51 (FIGS. 2, 3 and 5) hatched on the outer surface of the manipulator tube 6. In the reduction gear 9 (FIG. 5), the manipulator tube 6 rests on rollers 52.

The reduction gear 9 (FIG. 1) is kinematically coupled by means of shafts 53, 54, 55 and 56 and toothed pairs 57, 58 and 59 to a first drive 60. The reduction gear 11 is kinematically coupled by means of shafts 61, 62, 63 and 64 and toothed pairs 65, 66 and 67 to a second drive 68. The vertical rotary tube 3 extends through an opening 69, provided in a cover 70 of the sealed chamber 1, and is kinematically coupled by means of a shaft 71 and a toothed pair 72 to a third drive 73. The shafts 55 and 63 are arranged inside the vertical rotary tube 3. The shafts 56, 64 and 71 and the toothed pairs 59, 67 and 72 are arranged in a sealed housing 74 mounted on the cover 70 of the sealed chamber 1. The drives 60, 68 and 73 are mounted on the sealed housing 74 and are intended to drive the mechanisms of the recharging machine 2.

According to the invention, the recharging machine 2 further includes a device 75 to eliminate vibration of the manipulator tube 6 as it moves inside the reduction gear 9. The device 75 comprises a weight 76 which compensates the weight of the manipulator tube 6. The weight 76 is suspended on a movable pulley 77 and a cable 78. One end of the cable 78 is rigidly attached to the vertical rotary tube 3. The other end of the cable 78 (FIG. 2) is passed through an opening 79 of the stop 19 and secured with the aid of an axle 80 in a slot 81 of the carrier pipe 16. Between the weight 76 and the carrier pipe 16 (FIGS. 1 and 2), the cable 78 is engaged with a system of pulleys 82.

In a bottom 83 (FIG. 6) of the sealed chamber 1 there are provided channels 84, 85 and 86, through which the chamber 1 communicates with an intermediate distribution chamber 87 (FIG. 1) of a reactor vessel, a container (not shown) for storing new fuel assemblies 30, and a container (not shown) for storing spent fuel assemblies 30, respectively. The channels 84, 85 and 86 are arranged on a path 89 of movement of the manipulator tube 6 (FIG. 1). To each of the channels 84, 85 and 86 (FIG. 6) corresponds an inductive transmitter 90 of the position of the manipulator tube 6 in the sealed chamber 1. According to the invention, the inductive position transmitters 90 (FIGS. 1 and 6) are arranged in plugs 91 installed in a wall 92 of the sealed chamber 1.

The proposed system for handling fuel assemblies of a nuclear reactor also includes a means for blowing the fuel assembly 30 (FIG. 1) with an inert gas in the course of its transportation in order to remove afterheat. Said means comprises, in series connection, a suction pipe 93, a heat exchanger 94, a compressor 95, a delivery pipe 96, whose upper end extends into the vertical rotary tube 3, and the flexible hose 18 whose ends are coupled to the carrier pipe 16 and the vertical rotary tube, respectively. The cooling gas circulates as shown by the arrows in FIGS. 1 and 2.

Figure 7:
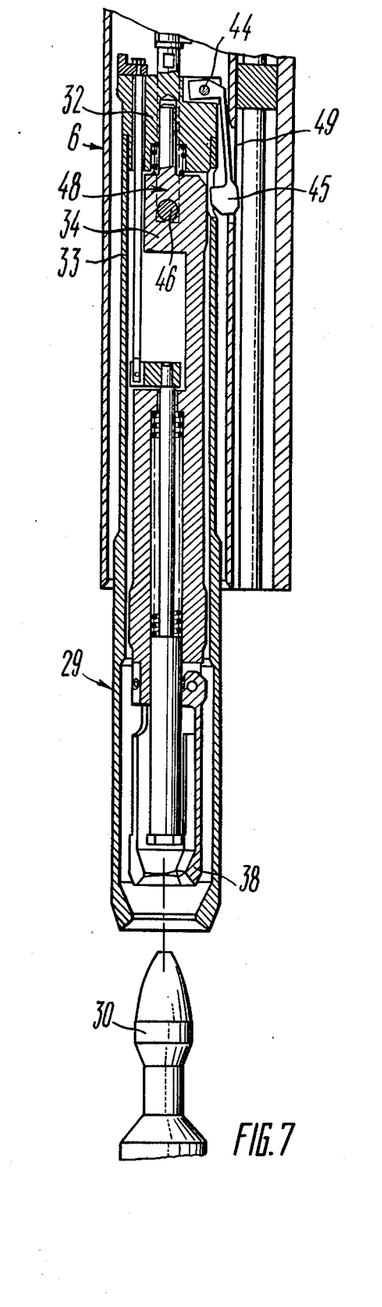
FIG. 7 is a sectional front view of the intermediate position of the manipulator tube with the open grip above a fuel assembly, in accordance with the invention.
Figure 8:
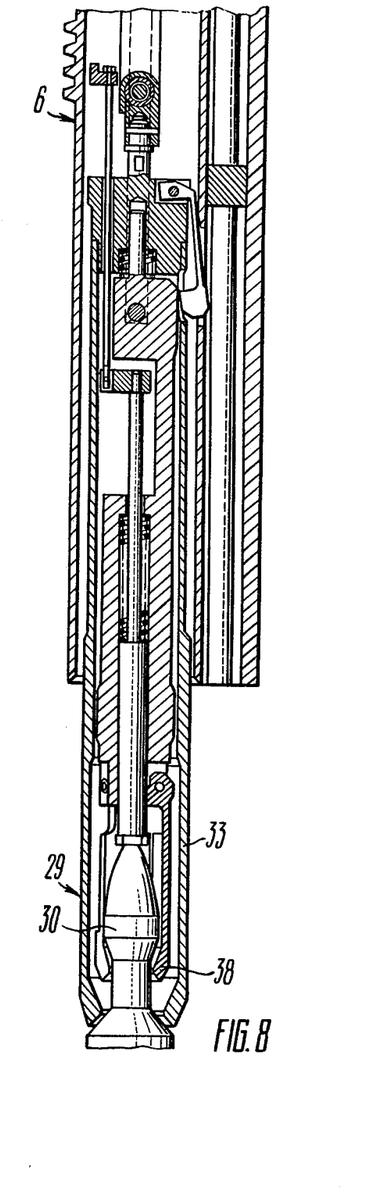
FIG. 8 is a sectional front view of the lower position of the manipulator tube with the open grip encompassing a fuel assembly, in accordance with the invention.
Figure 9:
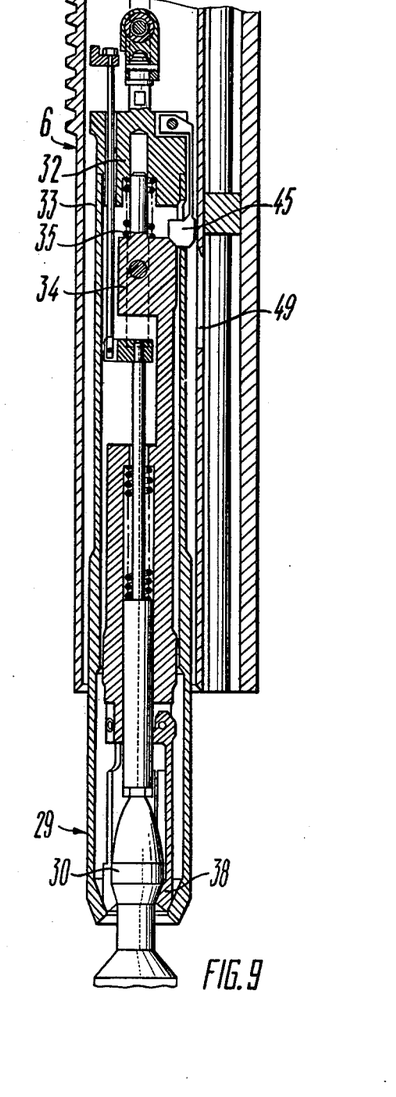
FIG. 9 is a sectional front view of the manipulator tube with the closed grip holding a fuel assembly, in accordance with the invention.

FIGS. 7, 8 and 9 explain the operation of the recharging machine 2 and show different positions of the manipulator tube 6 and the grip 29 in relation to the fuel assembly 30.

The proposed system for handling fuel assemblies of a nuclear reactor operates as follows.

Figure 5:
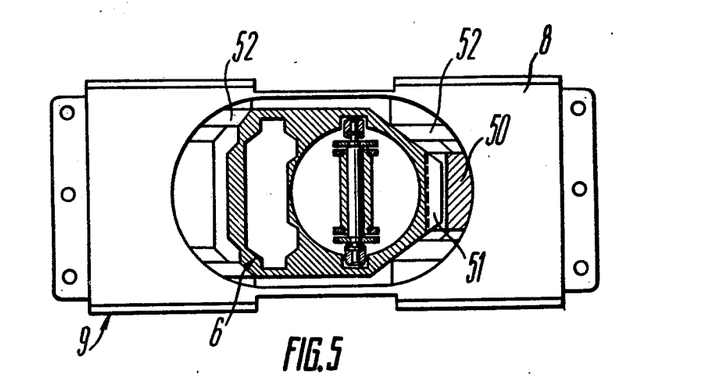
FIG. 5 is a section taken on the line V—V of FIG. 1, in accordance with the invention.
Figure 6:
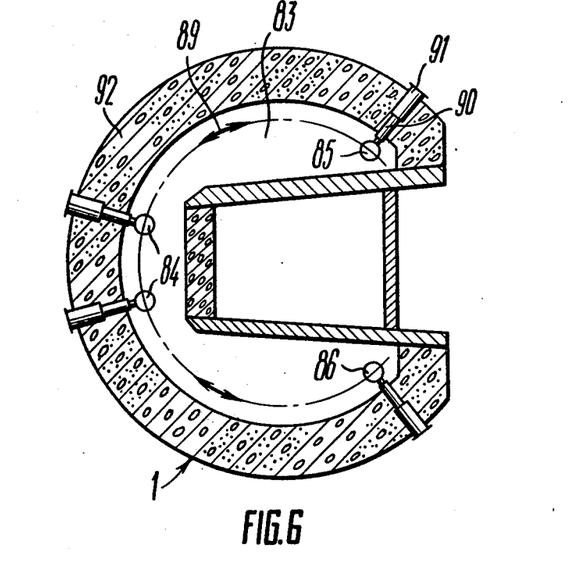
FIG. 6 is a section taken on the line VI—VI of FIG. 1, in accordance with the invention.

In the initial state, the carrier tube 5 (FIG. 1) of the recharging machine 2 is in the sealed chamber 1, in its intermediate position between the channels 84 and 85 (FIG. 6). The manipulator tube 6 (FIG. 1) is in its extreme upper position inside the carrier tube 5. The grip 29 is in its extreme upper position in the manipulator tube 6. At the start of the handling operations, the drive 73 through the shaft 71 and the toothed pair 72 turns the vertical rotary tube 3. As this takes place, the carrier tube 5 moves along the path 89 (FIG. 6) in the sealed chamber 1, whereas the manipulator tube 6 (FIG. 1) is brought to above the channel 83 (FIG. 6) of the container for storing the new fuel assemblies 30 (FIG. 1). The inductive transmitter 90 produces a signal to stop the manipulator tube 6. The drive 68 through the shafts 61, 62, 63 and 64 and the toothed pairs 65, 66 and 67 rotates the sprocket 20 (FIG. 2) of the reduction gear 11. The sprocket 20 lowers the grip 29 on the chain 21 (FIG. 3), so that the grip 29 is in its extreme lower position inside the manipulator tube 6. The rollers 25 (FIG. 2) of the chain 21 and the rollers 47 (FIG. 4) of the thrust pin 46 move along the guide slots 48. With the grip 29 (FIGS. 3 and 7) being in its extreme lower position, the rollers 47 (FIG. 4) abut against the end of the slot 48 (FIG. 7); the thrust pin 46 and the slider 34 stop, whereas the housing 33 continues to move down until the girdle 32 abuts against the slider 34. As this takes place, the locking means 45 interacts with the slider 34, turns about the axle 44 and is forced into the opening 49; the grip pawls 38 are disengaged from the housing 33 and remain freely suspended inside said housing 33. Then the drive 60 (FIG. 1) through the shafts 53, 54, 55 and 56 and the toothed pairs 57, 58 and 59 rotates the gear 50 (FIG. 5) of the reduction gear 9. As the gear 50 rotates, it interacts with the rack 51 of the manipulator tube 6. While resting on the rollers 52 of the reduction gear 9, the manipulator tube 6 is lowered into its extreme lower position and penetrates through the channel 85 (FIG. 6) into the container (not shown) for storing the new fuel assemblies 30. The lowering is accompanied by vibration of the manipulator tube 6 (FIG. 5), as the teeth of the rack 51 strike against those of the gear 50 under the weight of the manipulator tube 6 (FIGS. 1 and 5). The weight 76 (FIG. 1), which moves with the manipulator tube 6 on the cable 78 over the pulley 77, eliminates vibration of the manipulator tube 6, since it counterbalances the latter's weight. As the manipulator tube 6 (FIG. 8) is lowered into its extreme lower position, the grip 29, which is in its extreme lower position in the manipulator tube 6 and protrudes from the latter, is moved onto the upper end of the fuel assembly 30 and encompassed by the pawls 38.

All the subsequent manoeuvres of the vertical rotary tube 3 (FIG. 1), the manipulator tube 6 and the grip 29 are carried out with the aid of the drives 60, 68 and 73 as described above.

The fuel assembly 30 (FIG. 9) is clamped automatically, as the grip 29 is raised inside the manipulator tube 6. The girdle 32 and the housing 33 start to rise, whereas the slider 34, compressed by the spring 35, remains stationary. The girdle 32 disengages itself from the slide 34; the housing 33 interacts with the pawls 38 and closes them. Simultaneously, the locking means 45 is forced from the opening 49 into the gap between the girdle 32 and the slider 34; as a result, the two cannot move relative to each other, so the pawls 38 cannot be loosened by accident, while carrying the fuel assembly 30. The grip 29 with the fresh fuel assembly 30 is drawn inside the manipulator tube 6 (FIGS. 1 and 9). The manipulator tube 6 then moves up, out of the channel 85 (FIG. 6) and into the carrier tube 5 (FIG. 1). By turning the vertical rotary tube 3, the carrier tube 5 is driven along the path 89 (FIG. 6) inside the sealed chamber 1 until it reaches the channel 84. The manipulator tube 6 (FIG. 1) is stopped over one of the channels 84 (FIGS. 1 and 6) by the inductive transmitter 90. The manipulator tube 6 and then the grip 29 move down, and the fresh fuel assembly 30 is lowered into the intermediate distribution chamber 87 of the reactor vessel 88. When the grip 29 (FIG. 8) assumes its extreme lower position, its pawls 38 are disengaged from the housing 33 and opened. The new fuel assembly 30 (FIG. 1) is left in the intermediate distribution chamber 87, whereas the manipulator tube 6 and the open grip 29 are raised to assume their extreme upper position. The grip 29 moves upwards inside the manipulator tube 6.

By turning the vertical rotary tube 3 with the carrier tube 5 along the path 89 (FIG. 6), the manipulator tube 6 (FIG. 1) is brought to a stop above the channel 84, under which the used fuel assembly 30 is placed in the intermediate distribution chamber 87. The grip 29 (FIG. 7) is lowered inside the manipulator tube 6 and opened. The manipulator tube 6 (FIG. 8) is lowered through channel 84 (FIG. 1) into the intermediate distribution chamber 87, and the upper end of the spent fuel assembly 30 (FIG. 8) is encompassed by the grip pawls 38. The grip 29 is then closed and draws the spent fuel assembly 30 into the manipulator tube 6. The latter is then raised to assume its extreme upper position in the carrier tube 5. By turning the carrier tube 5 along the path 89 (FIG. 6), the spent fuel assembly 30 (FIG. 1) is transferred to the channel 86 (FIG. 6) of the container for storing spent fuel assemblies. By moving down the manipulator tube 6 (FIG. 1) and then the grip 29, the spent fuel assembly 30 is placed in the container. While the used fuel assembly 30 is transported between the channels 84 and 86 (FIG. 6), inert cooling gas is blown through it to remove afterheat. The gas is sucked from the chamber 1 (FIG. 1) into the suction pipe 93 and cooled in the heat exchanger 94. The compressor 95 directs the gas into the flexible hose 18 through the delivery pipe 96 and the vertical rotary tube 3. From the hose 18, through the orifice 15 of the carrier pipe 16, the pipe 14 and the opening 12, the gas is supplied inside the reduction gear 11 and therefrom, into the manipulator tube 6, wherein the spent fuel assembly 30 is arranged at the moment. The gas flows around and inside the fuel assembly 30, removing afterheat. In the course of vertical travels of the manipulator tube 6, one end of the hose 18 is bent and travels with said manipulator tube 6. After the spent fuel assembly 30 is placed in the storage container, the vertical rotary tube 3 is turned, and the carrier tube 5 moves along the path 89 (FIG. 6) and brings the manipulator tube 6 to above the channel 85 (FIG. 6). The remaining fuel assemblies of the nuclear reactor are handled in a similar manner.

The present invention is advantageous both technically and economically. This is due to the simplified design of the mechanisms incorporated in the system, easier access to these mechanisms, whereby maintenance and repair become much simpler, and reduced time for fuel recharging operations.

What is claimed is:

1. A system for handling fuel assemblies of a nuclear reactor, comprising:
   a sealed chamber having a cover, a closed wall, and a bottom;
   an opening provided in said cover of said sealed chamber;
   a recharging machine arranged inside said sealed chamber and having:
      a vertical rotary tube extending through said opening in said cover of said sealed chamber, so that one of its ends protrudes from said sealed chamber;
      a bracket mounted on an exterior surface of said vertical rotary tube;
      a carrier tube suspended on said bracket and having a lower flange and an internal cavity;
      a manipulator tube arranged inside said carrier tube, having an upper flange and an outer surface and moved along a predetermined path and through a prescribed angle by said rotary tube;
      a rack hatched on said outer surface of said manipulator tube;
      a first reduction gear having a housing with a gear of said first reduction gear arranged in said housing and interacting with said rack of said manipulator tube;
      rollers arranged in said housing of said first reduction gear and interacting with said manipulator tube;
      said housing of said first reduction gear being mounted on said lower flange of said carrier tube;
      a second reduction gear having a second housing and mounted on said upper flange of said manipulator tube;
      an opening provided in said second housing;
      a stop rigidly mounted on said internal surface of said carrier tube;
      an opening provided in said stop;
      a pipe connection having an inlet and an outlet;
      a carrier pipe of a stepped configuration, having an inlet and an outlet;
      said outlet of said pipe connection communicating with said opening provided in said second housing;
      said inlet of said pipe connection communicating with said outlet of said carrier pipe;
      a device for circulating an insert cooling gas through said fuel assembly;
      a flexible hose of said device for circulating communicating with said inlet of said carrier pipe;
      said stop limiting the vertical travel of said carrier pipe;
      a sprocket arranged in said second housing;
      a chain interacting with said sprocket and having a first end and a second end;
      a grip for clamping and transporting said fuel assembly mechanically coupled to one end of said chain and having axles and profiled grip pawls movably mounted on said axles;
      a first drive having shafts interconnected by toothed pairs kinematically connecting the first drive to said first reduction gear;
      a second drive having shafts interconnected by toothed pairs kinematically connecting the second drive to said second reduction gear;
      a third drive having a shaft and a toothed pair kinematically connecting the third drive to said end of said vertical rotary tube, which protrudes outside said sealed chamber, and rotating said vertical rotary tube through a prescribed angle;
      one of said shafts of said first drive and one of said shafts of said second drive extending through said opening in said cover of said sealed chamber and arranged inside said vertical rotary tube;
      said drives being located outside said sealed chamber;
      channels provided in said bottom of said sealed chamber on said path of movement of said manipulator tube;
      inductive position transmitters for sensing the position of said manipulator tube positioned in said sealed chamber;
      plugs installed in said closed wall of said sealed chamber,
      said inductive position transmitters being arranged in said plugs,
      the number of said inductive position transmitters being equal to that of said channels.

2. A system for handling fuel assemblies of a nuclear reactor as claimed in claim 1, which includes means for eliminating vibration of said manipulator tube as the latter moves inside said first reduction gear, said means being mounted on said vertical rotary tube.

3. A system for handling fuel assemblies of a nuclear reactor as claimed in claim 2, wherein said means for eliminating vibration of said manipulator tube as the latter moves inside said first reduction gear comprises;
   a weight to compensate for the weight of said manipulator tube;
   a system of pulleys;
   a cable interacting with said system of pulleys and having a first end and a second end;
   said first end of said cable being rigidly attached to said vertical rotary tube;
   said weight being suspended from one of the pulleys of said system of pulleys on said cable;
   said second end of said cable being passed through said opening in said stop and secured to said carrier pipe.

* * * * *